(12) United States Patent
Sakamura et al.

(10) Patent No.: US 7,896,236 B2
(45) Date of Patent: Mar. 1, 2011

(54) ELECTRONIC VALUE EXCHANGE SYSTEM AND ELECTRONIC VALUE EXCHANGE METHOD

(75) Inventors: Ken Sakamura, Tokyo (JP); Noboru Koshizuka, Musashino (JP); Kensaku Mori, Yokohama (JP); Masayuki Terada, Yokosuka (JP); Kazuhiko Ishii, Yokohama (JP); Sadayuki Hongo, Yokohama (JP)

(73) Assignees: NTT DoCoMo, Inc., Tokyo (JP); The University of Tokyo, Tokyo (JP)

( * ) Notice: Subject to any disclaimer, the term of this patent is extended or adjusted under 35 U.S.C. 154(b) by 69 days.

(21) Appl. No.: 11/377,360

(22) Filed: Mar. 17, 2006

(65) Prior Publication Data

US 2006/0208067 A1     Sep. 21, 2006

(30) Foreign Application Priority Data

Mar. 18, 2005   (JP)   ............................ P2005-080443

(51) Int. Cl.
*G06K 5/00* (2006.01)
(52) U.S. Cl. .................. 235/380; 235/379; 455/558
(58) Field of Classification Search ............... 235/379, 235/380; 455/558
See application file for complete search history.

(56) References Cited

U.S. PATENT DOCUMENTS

| | | | | |
|---|---|---|---|---|
| 4,454,414 | A * | 6/1984 | Benton | 705/41 |
| 5,461,217 | A * | 10/1995 | Claus | 235/380 |
| 2003/0036355 | A1 | 2/2003 | Gundlach | |
| 2003/0228886 | A1 * | 12/2003 | Ishii et al. | 455/558 |

FOREIGN PATENT DOCUMENTS

| | | | |
|---|---|---|---|
| EP | 1 221 669 A1 | 7/2002 | |
| EP | 1 369 829 A2 | 12/2003 | |
| GB | 2374192 A | * | 10/2002 |
| JP | 9-511350 | 11/1997 | |
| JP | 11-96273 | 4/1999 | |
| JP | 2003-337887 | 11/2003 | |

(Continued)

OTHER PUBLICATIONS

Ishii, et al., "Multimedia Information Processing-Research on Electronic Value/Right Distribution Method Using e-TRON-Equipped Mobile Terminals", NTT DoCoMo Technical Journal, The Telecommunication Association, vol. 12, No. 2, Jul. 1, 2004, pp. 21-29.

(Continued)

*Primary Examiner*—Michael G Lee
*Assistant Examiner*—Rafferty Kelly
(74) *Attorney, Agent, or Firm*—Oblon, Spivak, McClelland, Maier & Neustadt, L.L.P.

(57) ABSTRACT

A portable terminal, when receiving an exchange offer message of electronic values from a portable terminal, notifies an application program of an exchange offer content based on a listener corresponding to the message. When the application program accepts this offer content and when electronic values are determined as exchange objects, the portable terminal returns an exchange confirmation message of the electronic values. When the portable terminal receives the exchange confirmation message, it notifies an application program of an exchange content based on a listener corresponding to the message. When the application program accepts the exchange content, the exchange transaction of electronic values is started.

4 Claims, 3 Drawing Sheets

FOREIGN PATENT DOCUMENTS

| KR | 10-2004-0088048 | 10/2004 |
|---|---|---|
| WO | WO 95/30211 | 11/1995 |
| WO | WO 03/065182 A1 | 8/2003 |
| WO | WO 03/105040 A1 | 12/2003 |
| WO | WO 2005/103974 A1 | 11/2005 |

OTHER PUBLICATIONS

Hiroshi Aono, et al., "Securely Transferable Entity Platform for Mobile Communications", IPSJ Technical Report (2002-CSEC-19), vol. 2002, No. 122, Dec. 20, 2002, pp. 67-72.

Ohyama, "JBuilder Remodeling: Make JBuilder More Powerful by Own Work Open Tool", Java World, vol. 5, No. 7, Jul. 1, 2001, pp. 111-117.

Motoki Miura, et al., "An Animated Help System for Java Applets", IPSC Journal vol. 41, No. SIG4(PROV7), Jun. 15, 2000, pp. 56-64.

Ishii, et al., "Multimedia Information Processing-Research on Electronic Value/Right Distribution Method Using e-TRON-Equipped Mobile Terminals", NTT DoCoMo Technical Journal, The Telecommunication Association, vol. 12, No. 2, Jul. 1, 2004, pp. 21-29 (English Translation Only).

Hiroshi Aono, et al., "Securely Transferable Entity Platform for Mobile Communications", IPSJ Technical Report (2002-CSEC-19), vol. 2002, No. 122, Dec. 20, 2002, pp. 67-72 (First page w/English Abtract Only).

Ohyama, "JBuilder Remodeling: Make JBuilder More Powerful by Own Work Open Tool", Java World, vol. 5, No. 7, Jul. 1, 2001, pp. 111-117 (English Translation Only).

Motoki Miura, et al., "An Animated Help System for Java Applets", IPSC Journal vol. 41, No. SIG4(PROV7), Jun. 15, 2000, pp. 56-64 (English Translation Only).

* cited by examiner

ELECTRONIC VALUE EXCHANGE SYSTEM AND ELECTRONIC VALUE EXCHANGE METHOD

BACKGROUND OF THE INVENTION

1. Field of the Invention

The present invention relates to a technology of exchanging electronic values between communication terminals.

2. Related Background of the Invention

In recent years, the study on TRON (The Real-time Operating system Nucleus) is ongoing as a means for implementing a ubiquitous computing environment. Among others, for portable terminals incorporating an IC (Integrated Circuit) card such as an e-TRON card, a technology proposed is to perform direct transmission/reception of values between two IC cards, without intervention of an application program, on the occasion of exchanging electronic values such as electronic money or electronic coupons between terminals. An application of this technology to a system for charging an insufficient electronic value is an electronic value charge system to ensure high security and simplicity together, as disclosed in Patent Document 1 (Japanese Patent Application Laid-Open No. 2003-337887).

SUMMARY OF THE INVENTION

However, the above conventional technology is to directly perform the exchange of electronic values between the tamper-resistant IC cards. For this reason, the high security can be secured, while there is a problem of concern that the behavior on the IC card side cannot be always captured on the application program side. For example, since the IC card is a black box, the user of the terminal grasps the processing content through the application program. For this reason, the IC card cannot present necessary information to the user unless the application program is notified of a processing state.

An object of the present invention is therefore to provide a technology applied to exchange of electronic values between IC cards of terminal devices each provided with an application program outside the IC card and adapted to avoid the inconvenience due to the application program's incapability of recognizing the processing executed on the IC card side, interruption of communication between the IC cards, and so on.

An electronic value exchange system according to the present invention is an electronic value exchange system for implementing an exchange of electronic values between a sender terminal and a receiver terminal, the electronic values being retained in IC cards of the respective terminals, wherein the sender terminal comprises: transmitting means for transmitting a message to offer the exchange of electronic values (exchange offer message), to the receiver terminal; notifying means for, when receiving a message for confirming the exchange (exchange confirmation message), transmitted by transmitting means of the receiver terminal, calling up a listener corresponding to the message and notifying an application program of an exchange content based on the listener; and exchange means for performing the exchange of electronic values with the receiver terminal when an acceptance from the application program is acquired for the exchange content notified of by the notifying means; and wherein the receiver terminal comprises: notifying means for, when receiving an exchange offer message transmitted from the sender terminal, calling up a listener corresponding to the message and notifying an application program of an offer content based on the listener; and transmitting means for transmitting an exchange confirmation message to the sender terminal when an acceptance from the application program is acquired for the offer content notified of by the notifying means.

An electronic value exchange method according to the present invention comprises a transmission step wherein a sender terminal transmits a message to offer an exchange of electronic values, to a receiver terminal; a notification step wherein when the receiver terminal receives the exchange offer message transmitted in the transmission step, the receiver terminal calls up a listener corresponding to the message and notifies an application program of an offer content based on the listener; a transmission step wherein when an acceptance from the application program is acquired for the offer content notified of in the notification step, the receiver terminal transmits a message for confirming the exchange, to the sender terminal; a notification step wherein when the sender terminal receives the exchange confirmation message transmitted in the transmission step, the sender terminal calls up a listener corresponding to the message and notifies an application program of an exchange content based on the listener; and an exchange step wherein when an acceptance from the application program is acquired for the exchange content notified of in the notification step, the sender terminal performs the exchange of electronic values with the receiver terminal.

According to these aspects of the invention, when the receiver terminal receives from the sender terminal an offer to exchange an electronic value retained in an IC card of the receiver terminal, for an electronic value in an IC card of the sender terminal, it notifies the application program of the receiver terminal of this offer. When the application program returns an affirmative response to this offer content, based on manipulation by a user of the receiver terminal or the like, the receiver terminal requests the sender terminal to make confirmation of the exchange. Just as the receiver terminal did, the sender terminal notifies the application program of its own of this request. When the application program returns an affirmative response to this request content, based on manipulation by a user of the sender terminal or the like, the sender terminal then performs transmission of the electronic value to the receiver terminal. At the same time, the receiver terminal also transmits the electronic value to complete the exchange of electronic values. In this manner, the direct exchange transaction of electronic values between IC cards is executed in wait for the permission/negation determination by the application programs loaded on the respective terminals. Namely, the present invention enables the application programs on the respective terminals involved in the exchange of electronic values, to recognize the processing executed between the IC cards.

DESCRIPTION OF THE PREFERRED EMBODIMENTS

Figure 1:
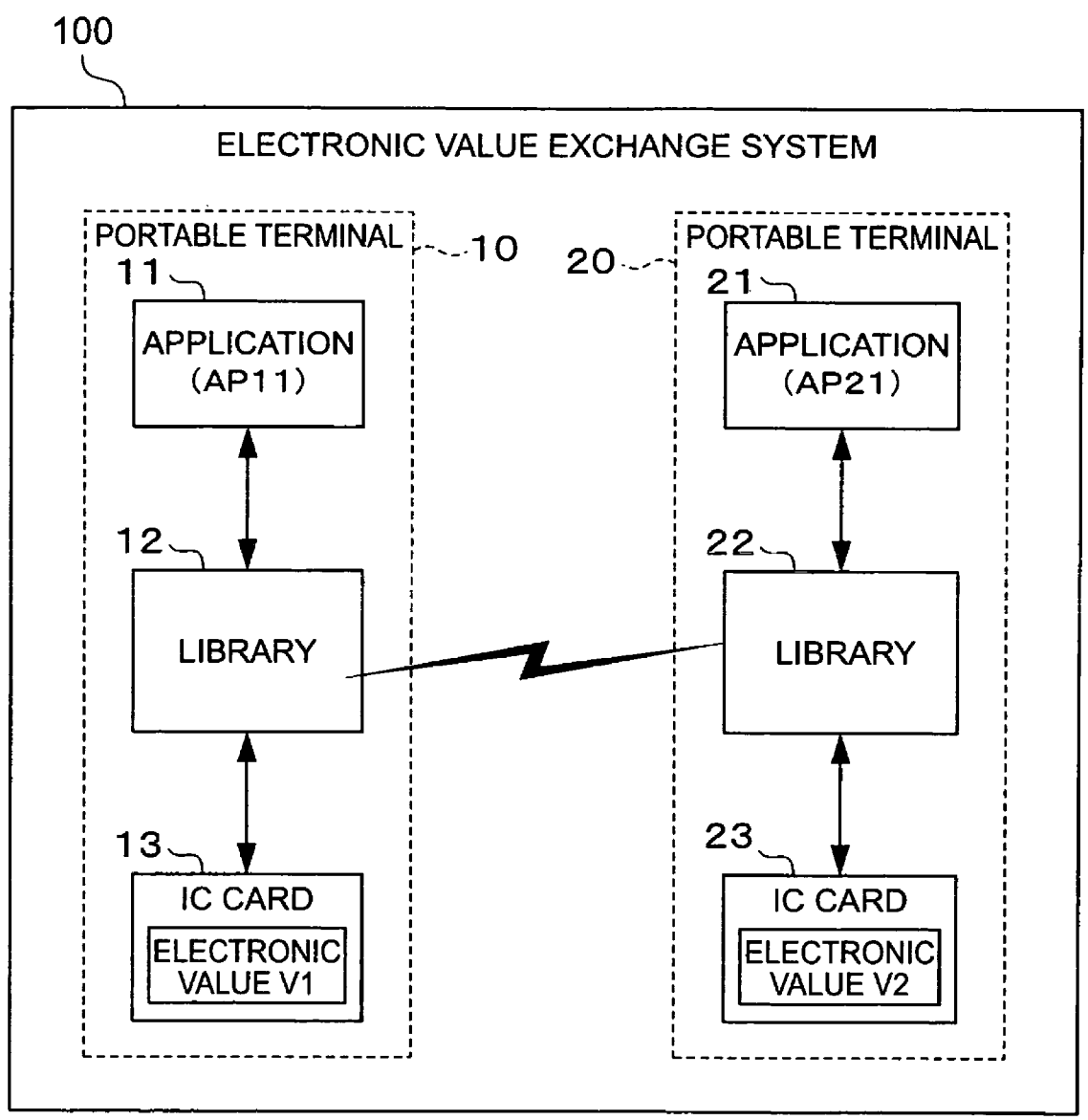
FIG. 1 is an illustration showing a configuration of an electronic value exchange system.

An embodiment of the present invention will be described below with reference to the accompanying drawings presented for illustrative purposes only. First, a configuration of electronic value exchange system 100 in the present embodiment will be described. As shown in FIG. 1, electronic value exchange system 100 comprises portable terminal 10 (corresponding to the sender terminal) and portable terminal 20 (corresponding to the receiver terminal). The portable terminals 10, 20 are, for example, cell phones or PDAs (Personal Digital Assistances), but may be any terminal equipment with a communication function, without any restrictions on function and use thereof. The portable terminal 10 and portable terminal 20 are configured so as to be able to transmit and receive electronic values via a short-range wireless communication line, using libraries owned by the respective terminals.

Subsequently, each of the components of the portable terminal 10 will be described. The portable terminal 10 has application program 11, library 12 (corresponding to the transmitting means and notifying means), and IC card 13 (corresponding to the exchange means). These components are connected so as to be able to import and export signals from and to each other through a bus.

When a user of the portable terminal 10 instructs an exchange of electronic values, the application program 11 (hereinafter referred to as "AP11") notifies the library 12 of this instruction. Furthermore, AP11 detects completion of an exchange of electronic values with input of "committed" from the library 12. At this time, the user of portable terminal 10 is notified of the completion of the exchange as occasion may demand.

With reception of "exchange" from AP11, the library 12 creates a message to instruct the IC card 13 to perform the exchange, and outputs the message to the IC card 13. When acquiring a message, the library 12 executes a listener corresponding thereto. For example, when receiving an exchange confirmation message transmitted from IC card 23, the library 12 notifies AP11 of an offer content based on a listener corresponding thereto. When an acceptance is acquired for the offer content, the library 12 outputs an exchange execution message to IC card 13 to instruct an exchange start of electronic values. When the library 12 acquires an exchange completion message from IC card 13 in conjunction with completion of an exchange of electronic values, it executes a listener "notify AP11."

An electronic value V1 as an object for an exchange is stored in the IC card 13. The IC card 13 is preferably constructed of a tamper-resistant device in terms of ensuring security, e.g., preventing falsification or reproduction of electronic value V1. The electronic value V1 is digitized data representing (or substantializing) some economic value and is equivalent, for example, to electronic money representing a monetary value, or to an electronic ticket (a book coupon, a commutation ticket, or the like) provided in a prepaid system.

With input of an exchange instruction message from the library 12, the IC card 13 transmits the message as an exchange offer message through the library 12 to the portable terminal 20. When receiving an exchange completion message from the IC card 23 through the libraries 22, 12, the IC card 13 outputs the exchange completion message to the library 12 of portable terminal 10.

When receiving the input of the exchange execution message from the library 12, the IC card 13 starts an exchange transaction of electronic values with a communication partner of IC card 23. This exchange transaction is directly carried out between the IC cards, without intervention of APs11, 21. Namely, the IC card 13 transmits the electronic value V1 stored inside, via libraries 12, 22 and a wireless line to the IC card 23. Similarly, the IC card 23 transmits an electronic value V2 via libraries 22, 12 and a wireless line to the IC card 13. The exchange is completed when the two IC cards receive the each other's electronic values.

The portable terminal 20 also has a configuration similar to that of the portable terminal 10. Namely, the portable terminal 20 has application program 21, library 22 (corresponding to the notifying means and transmitting means), and IC card 23. These components are connected so as to be able to import and export signals from and to each other through a bus.

The application program 21 (hereinafter referred to as "AP21") presents an offer content to a user of portable terminal 20 in accordance with "offered" fed from the library 22. AP21 awaits a user's instruction operation and, with an instruction of acceptance, it confirms the electronic values V1, V2 satisfying conditions for exchange objects and then sends a reply of "agree." Without acceptance instruction, "NG" is returned to the library 22. With input of "committed" from the library 22, AP21 detects completion of an exchange of electronic values. At this time, the user of portable terminal 20 is notified of the completion of the exchange as occasion may demand.

When acquiring a message, the library 22 executes a listener corresponding thereto. For example, when receiving an exchange offer message transmitted from IC card 13, the library 22 notifies AP21 of an offer content based on a listener corresponding thereto. With an acceptance for the offer content, the library 22 transmits an exchange confirmation message to the IC card 13, thereby encouraging the user of the portable terminal 10 to confirm a start of execution of the exchange transaction. When the library 22 acquires an exchange completion message from IC card 23 in conjunction with completion of the exchange of electronic values, it executes a corresponding listener "notify AP21."

When receiving the exchange confirmation message from the library 22, the IC card 23 transfers the message to the IC card 13. On the occasion of performing the exchange of electronic values, the IC card 23 transmits the electronic value V2 via libraries 22, 12 and a wireless line to the IC card 13.

Figure 2:
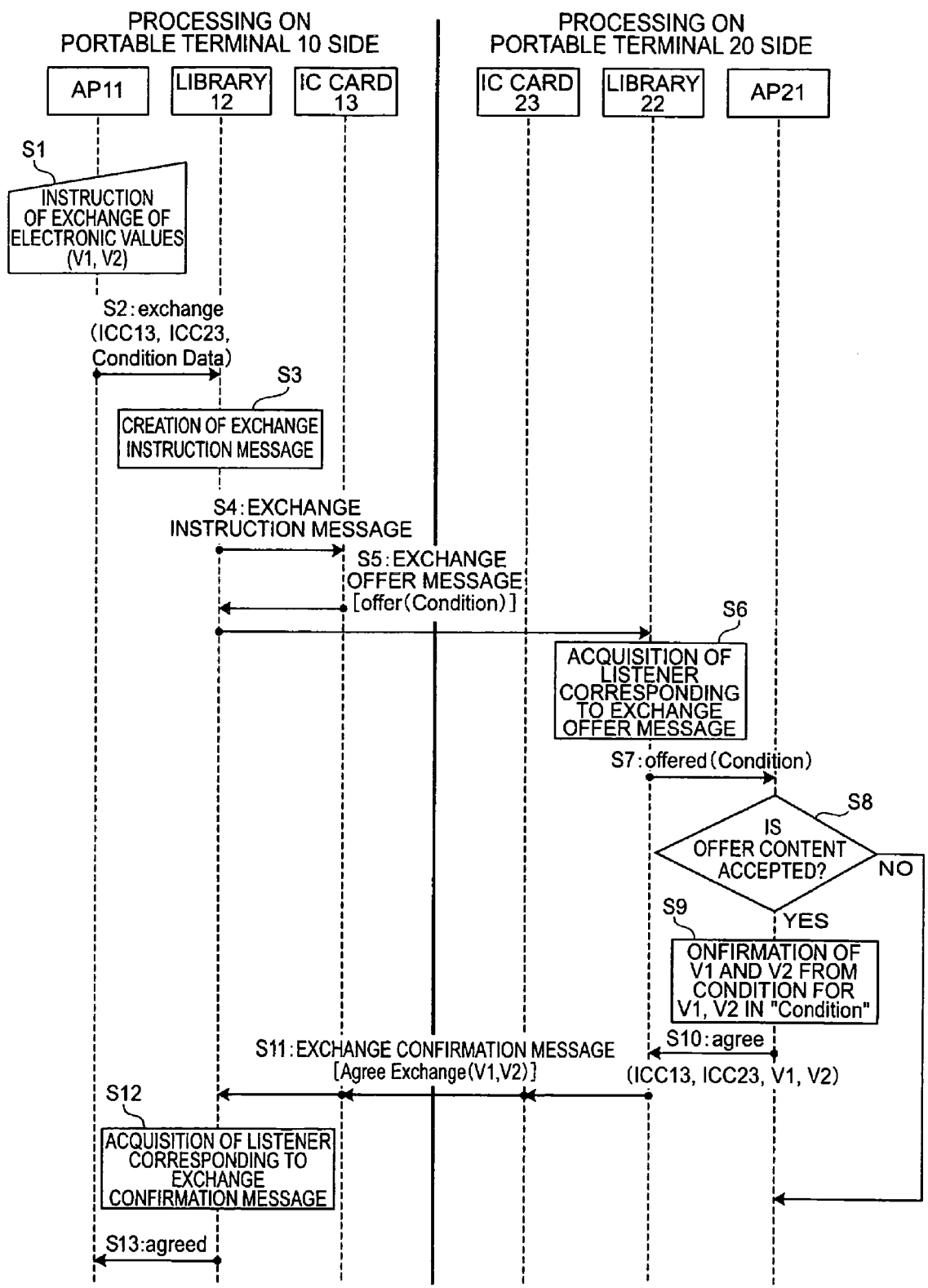
FIG. 2 is the first half of a chart for explaining an operation of the electronic value exchange system.

Next, an operation of electronic value exchange system 100 in the present embodiment and each of steps constituting an electronic value exchange method according to the present invention will be described with reference to FIGS. 2 and 3. The description is based on the assumption that a situation in the present embodiment is that the users desire to exchange the electronic value V1 owned by the user A of portable terminal 10, for the electronic value V2 owned by the user B of the portable terminal 20.

First, when receiving an instruction from the user A of portable terminal 10 (S1 in FIG. 2), AP11 instructs the library 12 to execute an exchange of electronic values, using API (Application Program Interface) (S2). A function to instruct the start of the exchange can be, for example, "exchange (ICC13, ICC23, ConditionData)." The exchange function has parameters of (source ID, destination ID, transmitted object data), and "ConditionData" as the transmitted object data contains at least a condition for electronic values V1, V2 that can be exchange objects.

The library 12, receiving the exchange instruction, converts the API into a message to create a message [StartExchange] to instruct the IC card 23 to perform an exchange of electronic values (S3). The library 12 transfers this exchange instruction message to the IC card 13 designated as a destination (S4).

The IC card 13, when receiving the exchange instruction message, transmits an exchange offer message having a condition for exchanged electronic values, "Condition," as a parameter, to the library 22 of IC card 23 as a communication partner (S5). This exchange offer message is transmitted via library 12 and can be represented by "offer(Condition)."

The library 22 on the portable terminal 20 side, when detecting reception of the exchange offer message, acquires a listener "notify AP21" corresponding to the message (S6). At S7, the library 22 transfers "offered (Condition)" as an offer content to AP21 in accordance with the description of the listener read out at S6. AP21, receiving the offer content, determines whether the offer content is to be accepted, based on an instruction by the user B of the portable terminal 20 (S8).

At S8, when the user B instructs an acceptance for the offer content (S8; YES), AP21 confirms the electronic values V1, V2 as exchange objects, which match the condition for V1, V2 in the aforementioned Condition. After the confirmation of the exchange objects, AP21 returns "agree" as an affirmative response to the library 22 (S10). The affirmative response contains at least IDs of IC cards 13, 23 to execute the exchange transaction, and IDs of the electronic values V1, V2 as exchange objects. With the reply of "agree," the library 22 determines that the user B accepted the offer content, and transmits [AgreeExchange(V1,V2)] being a message for confirming the exchange of electronic values, via IC cards 23, 13 to the library 12 (S11).

Thereafter, the library 12 of portable terminal 10 executes processes similar to the aforementioned steps S6, S7. Namely, the library 12 acquires a listener corresponding to the exchange confirmation message fed from the IC card 13 (S12). Then the library 12 transfers "agreed" as an exchange content to AP11 in accordance with the description of the listener (S13).

Figure 3:
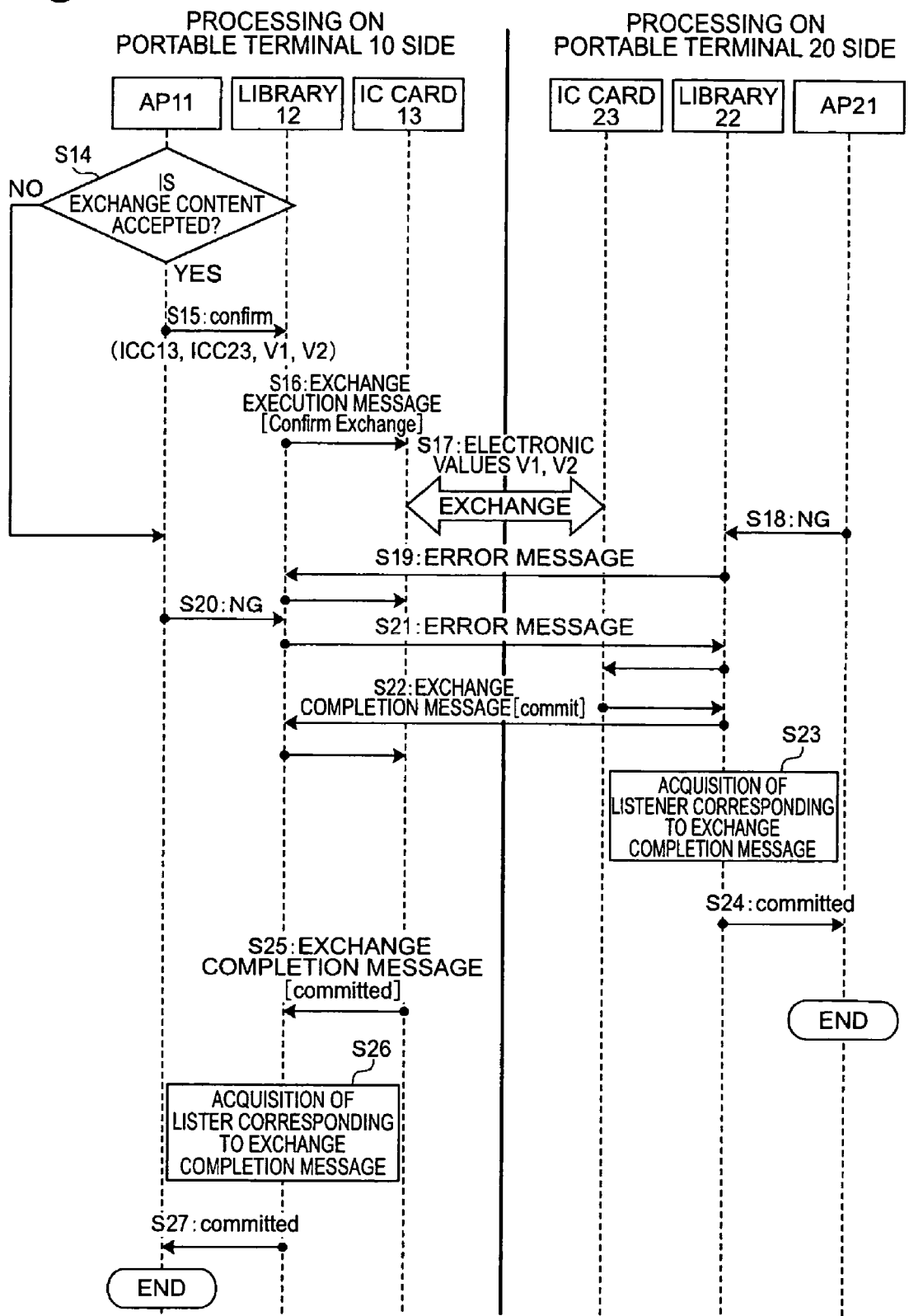
FIG. 3 is the second half of a chart for explaining an operation of the electronic value exchange system.

Referring next to FIG. 3, AP11 then determines the presence/absence of an acceptance for the exchange content, based on an instruction by the user A of portable terminal 10 (S14). When the user A instructs an acceptance (S14; YES), AP11 returns "confirm" as an affirmative response to the library 12 (S15). This affirmative response contains at least the IDs of the IC cards 13, 23 to execute the exchange transaction, and the IDs of the electronic values V1, V2 determined as exchange objects, as at S10. With this reply of "confirm," the library 12 determines that the user A accepted the offer content, and outputs an exchange execution message [ConfirmExchange] to the IC card 13 (S16).

When the IC card 13 receives the exchange execution message [ConfirmExchange], the exchange of electronic values owned by the respective IC cards is started between IC card 13 and IC card 23 (S17). The transmission/reception process of electronic values at S17 is completed through the libraries, but not through the application programs (as sort of "directly"). This prevents a stealthy glance or falsification of electronic values and maintains a high security level.

When at S8 the user B rejects the exchange (S8; NO), AP21 returns "NG" as a negative response to library 22 (S18). The library 22, receiving the negative response, notifies library 12 of an error for the exchange offer message received at S5. The IC card 13 receives the error message transferred from the library 12, to detect the rejection of the exchange of electronic values (S19).

Similarly, when at S14 the user A rejects the exchange (S14; NO), AP11 returns "NG" as a negative response to the library 12 (S20). The library 12, receiving the negative response, notifies the IC card 23 of an error for the exchange confirmation message received at S11, through the library 22 (S21). This allows the IC card 23 to detect the rejection of the exchange of electronic values.

When the exchange transaction of electronic values at S17 is normally completed, i.e., when the IC card 23 acquires the electronic value V1, the IC card 23 transmits [Commit] as an exchange completion message through the libraries 22, 12 to the IC card 13 (S22). In the transmission of the exchange completion message, the portable terminal 20 also executes processes similar to the aforementioned steps S6, S7. Namely, when transmitting the exchange completion message, the library 22 acquires a listener "notify AP21" corresponding to the message (S23). The library 22 transfers "committed" to AP21 in accordance with the description of the above listener read out at S23 (S24). This allows AP21 to recognize that the exchange transaction of electronic values has normally been completed.

On the other hand, after receiving the exchange completion message [Commit] transmitted at S22, the IC card 13 outputs an exchange completion message [Committed] to the library 12 (S25). In the output operation of the exchange completion message, the portable terminal 10 also executes processes similar to the aforementioned steps S23, S24.

Namely, the library 12, when receiving the input of the exchange completion message, acquires a listener "notify AP11" corresponding to the message (S26). At S27 the library 12 transfers "committed" to AP11 in accordance with the description of the above listener read out at S26. By the process of S27, AP11 comes to recognize that the exchange of electronic values has normally been completed.

The electronic value exchange system 100 described above has the operational effects described below. First, the library 22 on the receiver side notifies AP21 of the request content at every occurrence of an event. The direct exchange of electronic values between IC cards secures high security, but it is difficult for AP21 to grasp the processing between the IC cards in real time. In contrast to it, the above-stated notification eliminates such concern. Namely, the portable terminal can be provided with the function of letting the library monitor messages arriving at the receiver IC card. Since the application program is notified of the result of this monitoring, the application program is able to always grasp the processing on the IC card side.

In the electronic value exchange system 100, not only the receiver portable terminal 20 but also the sender portable terminal 10 can be provided with the function of letting the library monitor messages arriving at the IC card. Since AP11 is also notified of the result of this monitoring, AP11 is able to always grasp the processing on the IC card 13 side. Furthermore, the exchange transaction of electronic values between IC cards 13, 23 is not normally completed without being accepted by both of the application programs 11, 21 of the portable terminals 10, 20. As a result, the exchange of electronic values is implemented under a higher security level.

Second, the sender library 12 also notifies AP11 of completion of the exchange when the exchange of electronic values is completed. In the same manner as this, the receiver library 22 also notifies AP21 of completion of the exchange when the exchange of electronic values is completed. Namely, both the application programs 11, 12 of the portable terminals 10, 20 having performed the exchange of electronic values can quickly recognize that the exchange has normally been completed, and, if one of the notifications is absent, they can determine that the exchange of electronic values has not normally been completed.

Factors to cause a failure in normal completion of the exchange of electronic values include disconnection of a line due to reduction of communication resources, an instruction of interruption by the portable terminal, and so on. When the exchange transaction of electronic values is interrupted, the portable terminal 10 or portable terminal 20 can establish a connection with a communication control device located outside the electronic value exchange system 100. The communication control device is operated and managed by TTP (Trusted Third Party) and makes a determination on whether the exchange transaction is to be aborted or continued.

Furthermore, the electronic value exchange system 100 is able to asynchronously notify each application program of only necessary minimum information dependent on user's decisions, while maintaining confidentiality of processing in the IC card. This suppresses an increase in the processing load on the IC card.

The present invention enables the system and method to avoid the inconvenience arising from the application program's incapability of recognizing the processing executed on the IC card side, interruption of communication between IC cards, and so on when the terminal devices having the application programs outside the IC cards exchange electronic values between the IC cards.

What is claimed is:

1. An electronic value exchange system for implementing an exchange of electronic values between a sender portable terminal and a receiver portable terminal,
   wherein the sender portable terminal comprises:
      a sender IC card for storing electronic values;
      a sender library for monitoring messages arriving at the sender IC card; and
      a sender application program for detecting processing on the sender IC card side by being notified of the result of the monitoring by the sender library;
   wherein the receiver portable terminal comprises:
      a receiver IC card for storing electronic values;
      a receiver library for monitoring messages arriving at the receiver IC card; and
      a receiver application program for detecting processing on the receiver IC card side by being notified of the result of the monitoring by the receiver library;
   wherein the sender application program, when receiving an instruction for an exchange of electronic values from a user of the sender portable terminal, instructs an exchange of electronic values to the sender library;
   the sender library, when receiving an instruction for an exchange of electronic values from the sender application program, transmits an exchange instruction message to the sender IC card;
   the sender IC card, when receiving the exchange instruction message from the sender library, transmits an exchange offer message via the sender library to the receiver library;
   the receiver library, when receiving the exchange offer message via the sender library, calls up a listener corresponding to the exchange offer message and notifies, in accordance with the description of the listener, the receiver application program of a first offer content;
   the receiver application program, when receiving the first offer content notified from the receiver library, presents the first offer content to a user of the receiver portable terminal and confirms the electronic values of the exchange objects upon receiving an instruction of acceptance from the user of the receiver portable terminal, and sends a first affirmative response to the receiver library;
   the receiver library, when receiving the first affirmative response from the receiver application program, sends an exchange confirmation message to the sender library;
   the sender library, when receiving the exchange confirmation message, calls up a listener corresponding to the exchange confirmation message and notifies, in accordance with the description of the listener, the sender application program of a second offer content;
   the sender application program, when receiving the second offer content notified from the sender library, presents the second offer content to a user of the sender portable terminal and upon receiving an instruction of acceptance from the user of the sender portable terminal, sends the second affirmative response to the sender library;
   the sender library, when receiving the second affirmative response from the sender application program, outputs an exchange execution message to the sender IC card;
   the sender IC card, when receiving the input of the exchange execution message from the sender library, conducts an exchange of electronic values between the receiver IC card, through the sender library and the receiver library, but not through the sender application program and the receiver application program;
   the receiver IC card, when the exchange transaction of electronic values is normally completed, transmits a first exchange completion message through the receiver library and the sender library to the sender IC card;
   the receiver library, when receiving the first exchange completion message from the receiver IC card, calls up a listener corresponding to the first exchange completion message and notifies, in accordance with the description of the listener, the receiver application program that the exchange transaction of electronic values has normally been completed;
   the sender IC card, when receiving the first exchange completion message, outputs a second exchange completion message to the sender library; and
   the sender library, when receiving the input of the second exchange completion message outputted from the sender IC card, calls up the listener corresponding to the second exchange completion message and notifies, in accordance with the description of the listener, the sender application program that the exchange transaction of electronic values has normally been completed.

2. The electronic value exchange system according to claim 1, wherein the sender portable terminal or the receiver portable terminal, when the exchange of electronic values has not normally been completed between the sender portable terminal and the receiver portable terminal, connects with a communication control device located outside which makes a determination on whether the exchange transaction of electronic values is to be aborted or continued.

3. An electronic value exchange method in the electronic value exchange system for conducting the exchange of electronic values between a sender portable terminal and a receiver portable terminal, comprising:
   a step wherein a sender application program of the sender portable terminal, when receiving an instruction for an exchange of electronic values from a user of the sender portable terminal, instructs an exchange of electronic values to the sender library, the sender portable terminal comprises a sender IC card for storing electronic values, a sender library for monitoring messages arriving at the sender IC card, and the sender application program for detecting processing on the sender IC card side by being notified of the result of the monitoring by the sender library;
   a step wherein the sender library of the sender portable terminal, when receiving the instruction for the exchange of electronic values from the sender application program, transfers the exchange instruction message to the sender IC card;
   a step wherein the sender IC card of the sender portable terminal, when receiving the exchange instruction message from the sender library, transmits the exchange offer message to the receiver library via the sender library;

a step wherein the receiver library of the receiver portable terminal, when receiving the exchange offer message via the sender library, calls up a listener corresponding to the exchange offer message and notifies, in accordance with the description of the listener, the receiver application program of a first offer content, the receiver portable terminal comprises a receiver IC card for storing electronic values, the receiver library for monitoring messages arriving at the receiver IC card, and a receiver application program for detecting processing on the receiver IC card side by being notified of the result of the monitoring by the receiver library;

a step wherein the receiver application program of the receiver portable terminal, when receiving the first offer content notified from the receiver library, presents the first offer content to the user of the receiver portable terminal and confirms the electronic values of the exchange objects upon receiving an instruction of acceptance from the user of the receiver portable terminal, and sends the first affirmative response to the receiver library;

a step wherein the receiver library of the receiver portable terminal, when receiving the first affirmative response from the receiver application program, sends the exchange confirmation message to the sender library;

a step wherein the sender library of the sender portable terminal, when receiving the exchange confirmation message, calls up a listener corresponding to the exchange confirmation message and notifies, in accordance with the description of the listener, the sender application program of a second offer content;

a step wherein the sender application program of the sender portable terminal, when receiving the second offer content notified from the sender library, presents the second offer content to a user of the sender portable terminal and upon receiving an instruction of acceptance from the user of the sender portable terminal, sends a second affirmative response to the sender library;

a step wherein the sender library of the sender portable terminal, when receiving the second affirmative response from the sender application program, outputs an exchange execution message to the sender IC card;

a step wherein the sender IC card of the sender portable terminal, when receiving the input of the exchange execution message from the sender library, conducts an exchange of electronic values between the receiver IC card, through the sender library and the receiver library, but not through the sender application program and the receiver application program; a step wherein the receiver IC card of the receiver portable terminal, when the exchange transaction of electronic values is normally completed, transmits a first exchange completion message through the sender library and the receiver library to the sender IC card;

a step wherein the receiver library of the receiver portable terminal, when receiving the first exchange completion message from the receiver IC card, calls up a listener corresponding to the first exchange completion message and notifies, in accordance with the description of the listener, the receiver application program that the exchange transaction of electronic values has normally been completed;

a step wherein the sender IC card of the sender portable terminal, when receiving the first exchange completion message, outputs a second exchange completion message to the sender library; and a step wherein the sender library of the sender portable terminal, when receiving the input of the second exchange completion message outputted from the sender IC card, calls up the listener corresponding to the second exchange completion message and notifies, in accordance with the description of the listener, the sender application program that the exchange transaction of electronic values has normally been completed.

4. The electronic value exchange method according to claim 3, further comprising a step wherein the sender portable terminal or the receiver portable terminal, when the exchange of electronic values has not normally been completed between the sender portable terminal and the receiver portable terminal, connects with a communication control device located outside which makes a determination on whether the exchange transaction of electronic values is to be aborted or continued.

* * * * *